(No Model.)
J. FRENIER.
WHEEL.
No. 290,224. Patented Dec. 18, 1883.
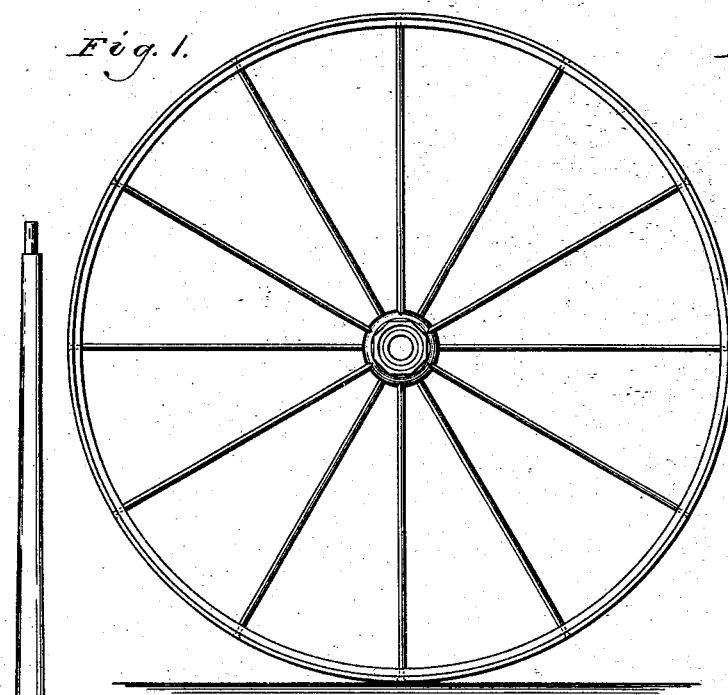
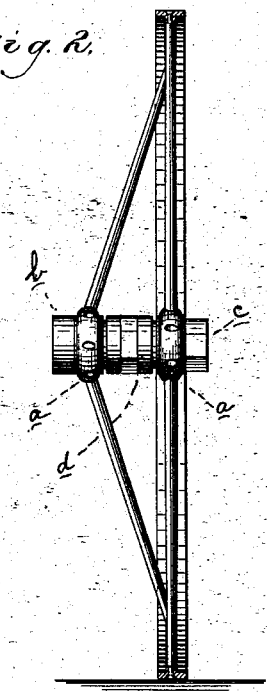
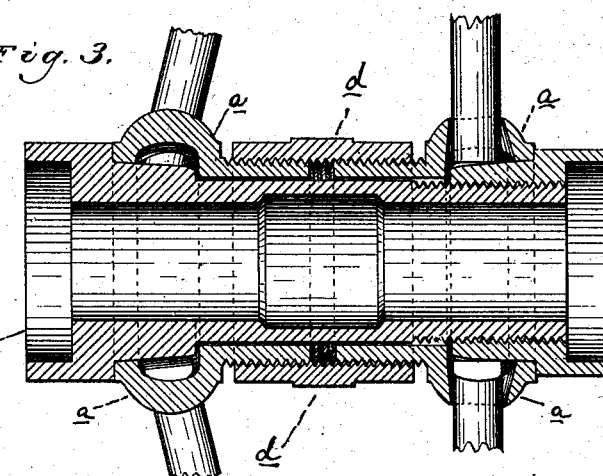
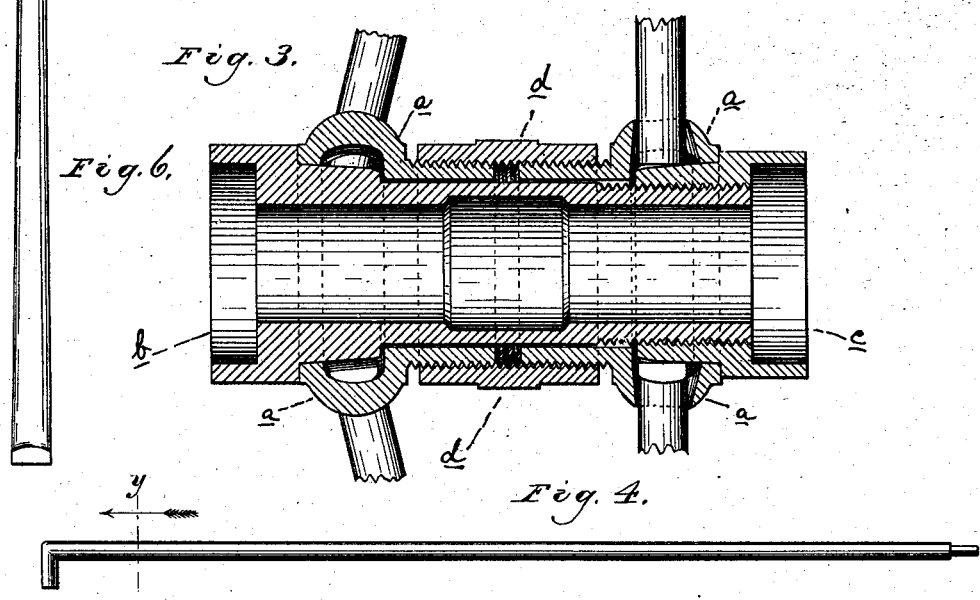
Witnesses.
Joseph Frenier
Inventor.
per: Wm. N. Iles
Attorney.

UNITED STATES PATENT OFFICE.

JOSEPH FRENIER, OF LA PORTE, INDIANA.

WHEEL.

SPECIFICATION forming part of Letters Patent No. 290,224, dated December 18, 1883.

Application filed November 8, 1883. (No model.)

*To all whom it may concern:*

Be it known that I, JOSEPH FRENIER, of the city and county of La Porte, and State of Indiana, have invented a new and useful Improvement in Wheels, of which the following is a specification.

The object of my invention is to furnish a wheel for agricultural implements and other vehicles, which may consist entirely of iron or other metal, with removable box, simple, compact, strong, and inexpensive. The leading improvement in the wheel, as compared with wheels heretofore made, is in the hub; but there are also improvements in the rim and spokes.

The drawings represent a wheel adapted to use on a corn-cultivator which embodies my invention. It is thirty inches in diameter, is designed for a spindle five inches long and one and one-eighth inch in diameter, and has a rim or tire one and one-quarter inch wide. These proportions may be varied to adapt the wheel to different uses.

Figure 1 is a side view of the wheel. Fig. 2 is a sectional view of the wheel, showing one side of the hub. Fig. 3 is a longitudinal section of the hub. Fig. 4 is a side view of a spoke. Fig. 5 is a perspective view and cross-section of the iron of which the spokes are made, and Fig. 6 is also a side view of a spoke.

The hub consists of five pieces, as shown in the drawings; or it may be made with four pieces only, if preferred, the central ring being omitted. The hub may be made entirely of cast-iron. The two exterior rings *a a* are provided with holes for the spokes. Near the outer end of each of these rings, immediately within the row of spoke-holes, there is an annular chamber or recess to receive the head of the spokes. The box *b* should fit snugly inside of the rings *a a*. A screw-thread is cut on one end of the exterior surface of the box, and a corresponding screw-thread is cut in the inner surface of the nut *c*. The other end of the box, and also of the nut *c*, has a shoulder to fit against the outer end of the spoke-holder ring. The outer end of the nut *c* may be constructed with eight sides, or other convenient number of sides, to engage a wrench. The annular nut *d* is provided with a right-handed screw-thread at one end and a left-handed screw-thread at the other end of its interior surface. This annular nut is not an essential portion of the wheel, but can be used, if desired, and in that case right and left threads should be cut on the exterior surface of the spoke-holder rings *a a*, to engage the similar screw-threads on the interior surface of the nut *d*. The outer surface of the box *b* is inclined from the shoulder toward the screw on the other end, and the outer surface of the nut *c* is similarly inclined. The hole through the box may be either straight or tapering to fit the spindle. The spokes may be made of oval iron. The width of the spoke-iron in the wheel illustrated in the drawings is one-half inch. A head may be formed on each spoke by bending the iron or other metal of which it is composed over sidewise. A tenon is forged on the outer end of each spoke by hammering or rolling the iron to the desired size. Each spoke may be rolled, if desired, to taper toward its outer end. The rim may be made of angle-iron, with a double angle, so that the central portion, in which the spoke-holes are made, has a greater thickness than the portions on each side. In the wheel illustrated in the drawings the central part of the rim is three-eighths of an inch thick and half an inch wide, and the thinner parts are one-eighth of an inch thick and three-eighths of an inch wide.

The operation of setting up the wheel after the different parts have been constructed may be as follows: The two spoke-holder rings *a a* are placed with their inner ends in contact with each other, and if the annular ring *d* is used it is screwed to its place. Then the spokes are passed through the spoke-holes in the hub from the inside, and the tenon on the outer ends of the spokes is inserted in the spoke-holes in the rim, and each spoke is riveted in, the rim being held in a vise during the operation. Then the box *b* is passed through the rings *a a* and fastened in place by screwing on the nut *c*, and if the nut *d* is also used it may then be tightened up, and the wheel will be complete. In case the box *b* becomes broken or worn out of shape, a new box may be substituted by simply unscrewing the nut *c*, removing the box, and putting a new box in place of the old one without disturbing the rest of the wheel. The head of each spoke is held firmly between the inner surface of one of the spoke-holder rings and the outer surface of the box or nut $c$. By this construction each spoke successively, as the wheel revolves, sustains a crushing weight and resists a drawing tension, according to its position at the moment, thus giving great firmness and solidity to the wheel. When the annulus $d$ is used, it adds to the solidity and symmetry in appearance of the hub; but when it is dispensed with the wheel is nevertheless neat in appearance and strong and serviceable. The wheel can be made dishing, if desired, by making the spokes at one end of the hub slightly shorter than the spokes in the other end. If the spokes are all of equal length, the wheel will not be dishing, but the rim will be in the plane of the center of the hub.

What I claim as my invention, and desire to secure by Letters Patent, is—

1. The spoke-holder rings having annular chambers, the spindle-box with shoulder on one end and screw-thread on the other, and the box-nut with shoulder and screw-thread to screw onto the box, all so constructed that the heads of the spokes may be in contact with the outer surface of the box and box-nut and with the inner surface of the spoke-holder rings.

2. The chambered spoke-holder rings, the right and left screw-threaded ring to screw onto the spoke-holder rings, the box and box-nut to be inserted within the rings and screwed together, the oval spokes with heads in contact on one side with the spoke-holder rings and on the other side with the box and box-nut, and the rim of angle-iron with spokes riveted into it.

JOSEPH FRENIER.

Witnesses:
 WILLIAM NILES,
 J. HENRY BAINES.